J. C. STEINER.
SCRAPER FOR MEAT CHOPPING MACHINES.
APPLICATION FILED OCT. 27, 1915.
1,177,148.
Patented Mar. 28, 1916.
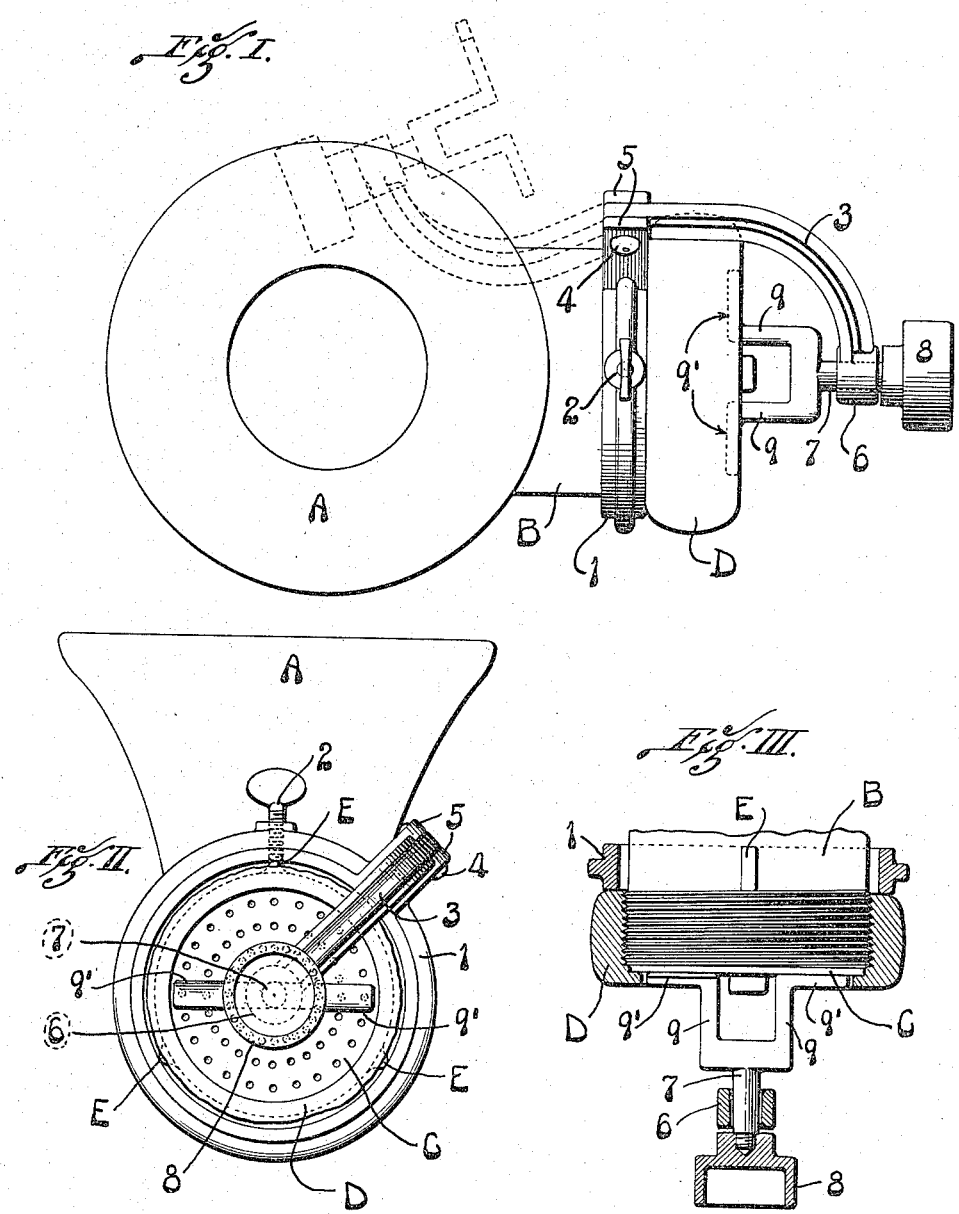
INVENTOR
J. C. Steiner
BY Knight + Cook ATTYS

UNITED STATES PATENT OFFICE.

JOSEPH C. STEINER, OF ST. LOUIS, MISSOURI.

SCRAPER FOR MEAT-CHOPPING MACHINES.

1,177,148.   Specification of Letters Patent.   Patented Mar. 28, 1916.

Application filed October 27, 1915.   Serial No. 58,126.

*To all whom it may concern:*

Be it known that I, JOSEPH C. STEINER, a citizen of the United States of America, a resident of the city of St. Louis, State of Missouri, have invented certain new and useful Improvements in Scrapers for Meat-Chopping Machines, of which the following is a full, clear, and exact description, reference being had to the accompanying drawings, forming a part of this specification.

My invention relates to means for scraping or wiping the discharge members of meat chopping machines, or the like, one of the objects being to produce a simple scraper, or wiping device adapted to be attached to a meat chopping machine in such a manner that it may be readily shifted into engagement with the perforated member from which the meat is discharged, and then actuated to remove the shredded meat therefrom. After the chopping or grinding operations, fine particles of meat hang from and usually almost entirely cover the surface of the perforated discharge member of a meat chopping machine, and it is now a very common practice for the operator to wipe the discharge member with his fingers, or by the use of a paddle or other device having no direct connection with the machine.

My invention is intended to avoid the inconvenience of using a paddle or other device not specially adapted to scrape the discharge member of a meat chopping machine, and also to provide an efficient scraping device associated with the machine so that it is always ready for service, at the same time avoiding the more unsanitary methods of removing the meat from the discharge member.

Briefly stated, the preferred form of the invention is an attachment comprising a support adapted to be secured to a meat chopping machine, a scraper guide pivoted to said support and a scraping device rotatably fitted to said guide, the guide being movable on its pivot to shift the scraping device toward and away from the discharge member of the machine, thus permitting the scraping device to occupy an operative position wherein it may be forced into engagement with the discharge member and then rotated to remove the meat therefrom, also permitting said scraping device to be shifted to an inoperative position wherein it will not in any way interfere with the meat passing from the machine.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a plan view of a meat chopping machine equipped with a scraping device constructed in accordance with the invention. Fig. II is a front elevation of the structure shown in Fig. I, a portion of the meat chopping machine being broken away to show the supporting ring which forms part of my attachment. Fig. III is a horizontal section, partly in elevation, showing the end portion of the meat chopping machine and some of the elements of my attachment.

The meat chopping machine comprises an intake bowl or hopper A, a cylindrical chopping or grinding compartment B, a perforated discharge member C in the form of a disk located at one end of the cylindrical member B, and a retaining ring D screwed onto the cylindrical member B to secure the perforated discharge member C. Lugs E are formed on the cylindrical member B at a point near the retaining ring D.

The preferred form of the invention comprises a supporting ring 1 surrounding the cylindrical member B at a point behind the retaining ring D. The supporting ring 1 is fitted to the lugs E and detachably secured to the machine by means of a set screw 2 passing through said ring and fitted to one of the lugs E.

3 designates a scraper guide in the form of an arm extending from the supporting ring 1 to a point immediately in front of the discharge member C. The scraper guide 3 is secured, by means of a pivot member 4, to ears 5 extending from the ring 1. A bearing 6 is formed at the free end of the scraper guide 3, and when the parts occupy their operative positions this bearing lies immediately in front of, and approximately in alinement with, the center of the discharge member C. The scraping device comprises a shaft 7 rotatably and slidably fitted to the bearings 6, an operating knob 8 secured to said shaft, and scraper arms 9 extending from said shaft, each of said arms 9 being provided with a scraping element 9' in the form of a blade adapted to engage the perforated discharge member C. The bearing 6 lies approximately between the operating knob 8 and the scraper arms 9, and the shaft 7 uniting the elements 8 and 9 is loosely fitted to said bearing 6 as shown in Fig. III. The operating knob 8 is manipulated to shift the scraping elements 9' toward and away from the perforated discharge member C, and it may be turned to rotate said scraping elements while they are engaged with said discharge member. Since the shaft 7 is loosely fitted to the bearing 6 (Fig. III) the scraping device may be tilted in said bearing, to permit the scraping elements 9' to adjust themselves to the face of the discharge member C when the operating knob 8 is forced toward said discharge member, thereby insuring the desired contact throughout the length of the scraping elements, even though the bearing 6 is not accurately located in a predetermined position. In other words, the loose connection between the shaft 7 and bearing 6 will compensate for irregularities in the structure, to insure the desired contact between the scraping elements and the discharge member C.

When the device is not in service the scraper guide 3 and the elements carried thereby occupy the positions shown by dotted lines in Fig. I. It will be apparent that the scraper guide 3 may be readily turned on the pivot 4 to shift the scraping device from its operative position, shown by full lines in Fig. I, and its inoperative position shown by dotted lines, thus locating the scraping elements at a point where they will not in any way interfere with the operation of the meat chopping machine. The axis of the pivot member 4 lies at an angle of approximately 45° with respect to a vertical or horizontal line so that the scraper guide 3 and the scraping device may be readily retained in their operative or inoperative positions. When these parts occupy the position shown by dotted lines in Fig. I they tend to drop by gravity and their movement is limited by the body of the meat chopping machine, and when they are shifted to the positions shown by full lines they tend to remain in this position.

I claim:—

1. A meat chopping machine having a discharge member, a support, a scraping device, and means for loosely securing said scraping device to said support so that said scraping device may be readily shifted from an operative position wherein it engages said discharge member to an inoperative position wherein it lies at a point remote from said discharge member, said means including a bearing to which said scraping device is rotatably fitted, and the axis of said bearing being approximately parallel with the axis of said discharge member when the scraping device occupies its operative position.

2. A meat chopping machine having a discharge member, a support, a scraper-guide, a pivot member securing said scraper-guide to said support, and a scraping device fitted to said scraper-guide, said scraper-guide being movable about the axis of said pivot member to carry said scraping device toward and away from said discharge member, and the axis of said pivot member being at an angle to a vertical line.

3. A meat chopping machine having a discharge member, a support, a scraper-guide pivotally secured to said support, and a scraping device rotatably mounted in said scraper-guide, said scraper-guide being movable about the axis of its pivot to carry the scraping device toward and away from said discharge member, and the scraping device being adapted to rotate while it is in engagement with said discharge member.

4. A meat chopping machine having a discharge member, a support, a scraper-guide in the form of an arm extending from said support to a point immediately in front of said discharge member, a pivot member securing said scraper-guide to said support, and a scraping device rotatably fitted to the free end portion of said scraper-guide and adapted to engage said discharge member, said scraper-guide being movable about the axis of its pivot to shift the scraping device toward and away from said discharge member.

5. A meat chopping machine having a discharge member, a support, a scraper-guide secured to said support and extending to a point immediately in front of said discharge member, said scraper-guide being provided with a bearing at the last mentioned point, a scraping device slidably and rotatably fitted to said bearing and adapted to engage said discharge member, said scraping device being loosely fitted to said bearing so that it may be tilted therein to adjust its scraping elements on the face of said discharge member.

6. A meat chopping machine having a perforated discharge member, a support, a scraper-guide in the form of an arm extending from said support to a point immediately in front of said discharge member, a pivot member securing said scraper-guide to said support, a bearing being formed at the free end of said scraper-guide, a shaft rotatably and slidably fitted to said bearing, scraper blades secured to said shaft and adapted to engage said discharge member, an operating member secured to said shaft, said bearing being located substantially between said operating member and the scraper blades, said shaft being loosely fitted to said bearing so that it may be tilted to adjust the scraper blades on the face of said discharge member, and said scraper-guide being movable about the axis of its pivot to shift said scraper-blades away from said discharge member.

7. An attachment of the character described comprising a support adapted to be secured to a meat chopping machine, a scraper-guide extending from said support, and a scraping device secured to said scraper-guide and adapted to engage the discharge member of the meat chopping machine, said scraping device being movably fitted to said scraper-guide so that it may be adjusted toward and away from said discharge member.

8. An attachment of the character described comprising a support adapted to be secured to a meat chopping machine, a scraper-guide extending from said support, a scraping device secured to said scraper-guide and adapted to engage the discharge member of the meat shopping machine, and a pivot member securing said scraper-guide to said support, said scraper-guide being movable about the axis of said pivot member to shift the scraping device toward and away from said discharge member.

9. An attachment of the character described comprising a ring adapted to surround a portion of a meat chopping machine, means for securing said ring to the meat chopping machine, a scraper-guide secured to and extending from said ring, and a rotatable scraping device fitted to said scraper-guide and adapted to engage the discharge member of the meat chopping machine.

10. An attachment of the character described comprising a ring adapted to surround a portion of a meat chopping machine, a scraper-guide in the form of an arm extending from said ring, a pivot member securing said scraper-guide to said ring, a bearing being formed at the free end of said scraper-guide, a shaft rotatably and slidably fitted to said bearing, a scraper secured to said shaft and adapted to engage the discharge member of the meat chopping machine, an operating member secured to said shaft, said bearing being located substantially between said operating member and the scraper, said operating member being movable to slide said shaft in said bearing thereby moving said scraper toward and away from said discharge member and also adapted to turn said shaft and scraper while the latter engages the discharge member, and said scraper-guide being movable about the axis of its pivot to shift said scraper, shaft and operating member to an inoperative position beyond said discharge member.

JOSEPH C. STEINER.

Copies of this patent may be obtained for five cents each, by addressing the "Commissioner of Patents, Washington, D. C."